(12) United States Patent
Kaino et al.

(10) Patent No.: US 10,226,989 B2
(45) Date of Patent: Mar. 12, 2019

(54) VEHICLE OPENING-CLOSING BODY CONTROL APPARATUS

(71) Applicant: Aisin Seiki Kabushiki Kaisha, Kariya-shi (JP)

(72) Inventors: Takashi Kaino, Anjo (JP); Hirotoshi Nakamura, Toyoake (JP); Yasuhiro Awata, Kariya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 224 days.

(21) Appl. No.: 15/197,939

(22) Filed: Jun. 30, 2016

(65) Prior Publication Data

US 2017/0022746 A1 Jan. 26, 2017

(30) Foreign Application Priority Data

Jul. 23, 2015 (JP) .................................. 2015-145903

(51) Int. Cl.
| | |
|---|---|
| *E05F 15/60* | (2015.01) |
| *B60J 5/06* | (2006.01) |
| *E05B 81/56* | (2014.01) |
| *E05B 81/70* | (2014.01) |
| *E05B 83/40* | (2014.01) |

(Continued)

(52) U.S. Cl.
CPC ............... *B60J 5/062* (2013.01); *E05B 81/56* (2013.01); *E05B 81/70* (2013.01); *E05B 83/40* (2013.01); *E05C 17/60* (2013.01); *E05F 15/70* (2015.01); *E05B 2047/0097* (2013.01); *E05Y 2400/30* (2013.01); *E05Y 2400/512* (2013.01); *E05Y 2900/531* (2013.01)

(58) Field of Classification Search
CPC .......... B60J 5/062; E05B 81/56; E05B 83/40; E05B 81/70; E05B 2047/0097; E05F 15/70; E05C 17/60; E05Y 2900/531; E05Y 2400/30; E05Y 2400/512
USPC .............. 701/49; 49/360, 280, 28; 340/5.72; 296/155; 318/280
See application file for complete search history.

(56) References Cited

U.S. PATENT DOCUMENTS

2003/0140565 A1* 7/2003 Otomo .................. B60J 7/0573
49/360
2006/0164029 A1* 7/2006 Suzuki .................... E05F 15/42
318/283

(Continued)

*Primary Examiner* — Marthe Y Marc-Coleman
(74) *Attorney, Agent, or Firm* — Oblon, McClelland, Maier & Neustadt, L.L.P.

(57) ABSTRACT

A vehicle opening-closing body control apparatus includes: a driving device driving an opening-closing body; a lock device retaining the opening-closing body in fully open and fully closed positions by including a latch mechanism, which performs an engagement action depending on a movement position of the opening-closing body; and a control device controlling the actions of the driving and lock devices, wherein the control device includes a position determination unit determining whether the movement position is in an engagement action position of the latch mechanism in a case in which driving control of the opening-closing body is stopped, and it becomes possible for the driving control to be restarted thereafter, and an engagement release control unit causing the latch mechanism to perform a release action by controlling the action of the lock device in a case in which it is determined that the movement position is in the engagement action position.

6 Claims, 3 Drawing Sheets

(51) Int. Cl.
  *E05F 15/70* (2015.01)
  *E05C 17/60* (2006.01)
  *E05B 47/00* (2006.01)

(56) References Cited

U.S. PATENT DOCUMENTS

2006/0254145 A1* 11/2006 Langfermann ....... E05B 63/143
                                                    49/279
2014/0001771 A1*  1/2014 Shibayama ............. E05B 81/14
                                                    292/100
2014/0145652 A1*  5/2014 Yamamoto ................ H02P 3/08
                                                    318/139

* cited by examiner

VEHICLE OPENING-CLOSING BODY CONTROL APPARATUS

CROSS REFERENCE TO RELATED APPLICATIONS

This application is based on and claims priority under 35 U.S.C. § 119 to Japanese Patent Application 2015-145903, filed on Jul. 23, 2015, the entire contents of which are incorporated herein by reference.

TECHNICAL FIELD

This disclosure relates to a vehicle opening-closing body control apparatus.

BACKGROUND DISCUSSION

In the related art, in vehicle opening-closing body control apparatuses that have a driving source and move an opening-closing body of a vehicle, for example, in the manner of the sliding door control apparatus disclosed in Japanese Patent No. 3666732 (Reference 1), driving control of a sliding door, which corresponds to an opening-closing body, is stopped when there is a reduction in a power source voltage. Further, after the reduced power source voltage is recovered, the driving control before stopping is restarted.

That is, in a vehicle in which there is a limit to the capacitance of an on-vehicle power source, for example, there are cases in which the power source voltage is reduced temporarily due to cranking of the engine being initiated, or the like. Further, since the supply of driving power becomes unstable in cases in which driving control of a sliding door is executed in such a state, there is a problem in that it is not possible to guarantee a smooth opening-closing action of such a sliding door.

However, by adopting the above-mentioned configuration of the related art, it is possible to avoid the occurrence of such problems. Further, after a power source voltage is recovered, it is possible to achieve an improvement in convenience as a result of an opening-closing action of a sliding door being restarted automatically.

Additionally, when the driving control is stopped, a sliding door control apparatus of the related art sets a driving motor to a break state while an electromagnetic clutch, which is provided on the driving device, is maintained in a connected state. Further, as a result of this, there is a configuration that regulates movement of a sliding door when the driving control is stopped.

However, even if countermeasures such as those mentioned above are taken, there are cases in which a movement position of a sliding door is changed as a result of an external force, which exceeds a break force of the driving motor. Further, as a result of this, there is a possibility that a latch mechanism, which configures a lock device, will perform an engagement action due to the sliding door moving in the vicinity of a fully open position or a fully closed position. Therefore, in the above-mentioned related art, since there is a possibility that it will not be possible to restart driving control of a sliding door smoothly due to interference of the latch mechanism, there is still room for improvement in this feature.

SUMMARY

Thus, a need exists for a vehicle opening-closing body control apparatus which is not suspectable to the drawback mentioned above.

A vehicle opening-closing body control apparatus according to an aspect of this disclosure preferably includes a driving device that drives an opening-closing body of a vehicle, a lock device that retains the opening-closing body in a fully open position and a fully closed position by including a latch mechanism, which performs an engagement action depending on a movement position of the opening-closing body, and a control device that controls the actions of the driving device and the lock device, and the control device is preferably includes a position determination unit that determines whether or not the movement position of the opening-closing body is in an engagement action position of the latch mechanism in a case in which driving control of the opening-closing body is stopped, and it becomes possible for the driving control to be restarted thereafter, and an engagement release control unit that causes the latch mechanism to perform a release action by controlling the action of the lock device in a case in which it is determined that the movement position of the opening-closing body is in the engagement action position of the latch mechanism.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment in which a vehicle opening-closing body control apparatus is objectivized as a power sliding door apparatus will be described in accordance with the drawings.

Figure 1:
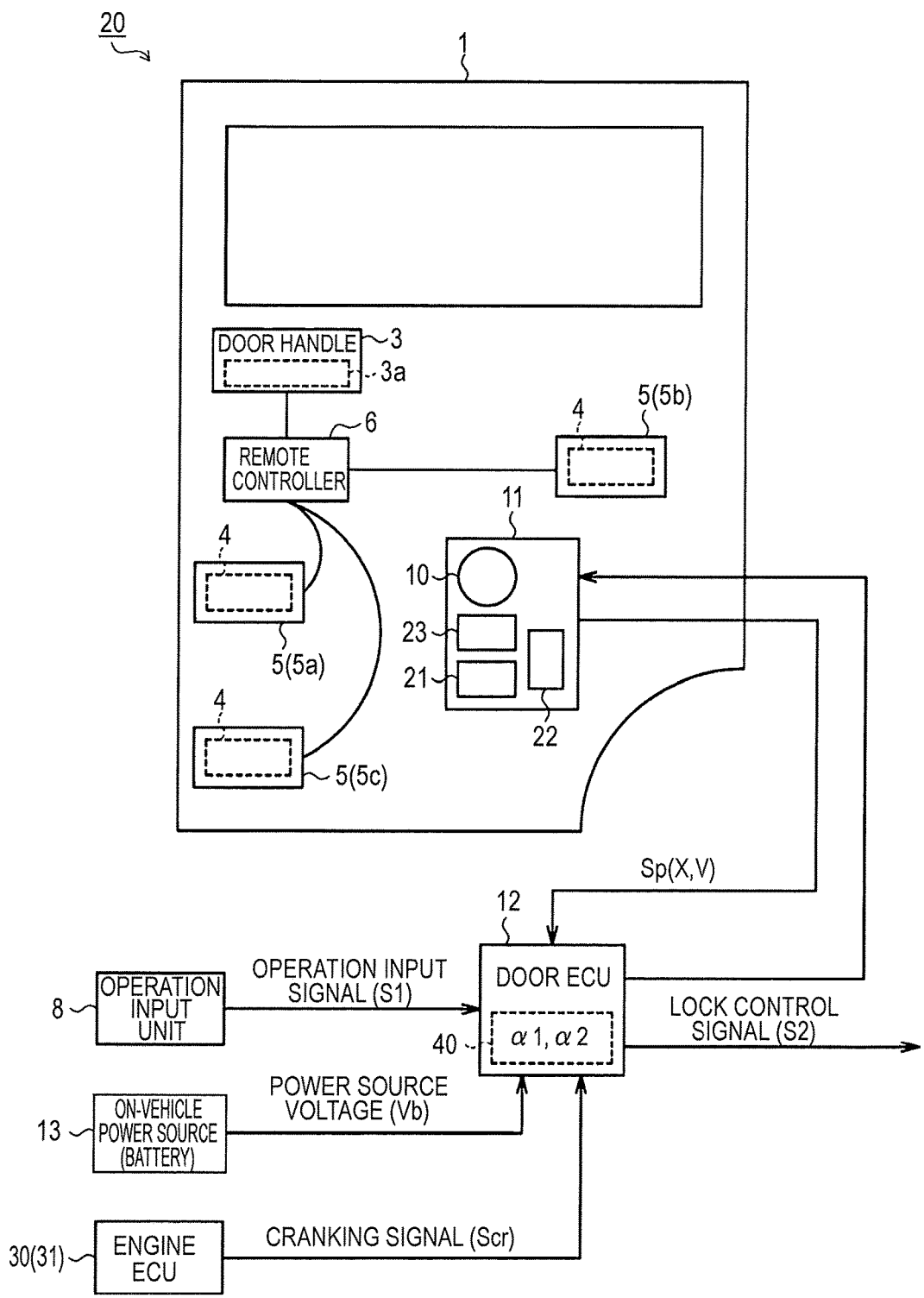
FIG. 1 is a schematic configuration diagram of a power sliding door apparatus.

As shown in FIG. 1, a sliding door 1 opens and closes a door opening unit, which is provided on a side surface of a vehicle, which is not illustrated in the drawings, as a result of being supported by the side surface of the vehicle and moving in a front-back direction. More specifically, the sliding door 1 is configured to attain a fully closed state, which blocks the door opening unit, as a result of moving to a vehicle front side (the left side in the drawing), and attain a fully open state, in which a passenger can get in and out through the door opening unit, as a result of moving to a vehicle back side (the right side in the drawing). Further, a door handle 3 for opening and closing the sliding door 1 is provided on the sliding door 1.

In addition, a plurality of lock devices 5, which include well-known latch mechanisms 4 that engage with strikers (not illustrated in the drawings), provided on a vehicle body side, depending on a movement position of the sliding door 1, are provided on the sliding door 1. More specifically, a front lock 5a and a rear lock 5b are provided on the sliding door 1 as fully closed locks, which retain the sliding door 1 in a fully closed position. Furthermore, a fully open lock 5c for retaining the sliding door 1 in a fully open position is provided on the sliding door 1. Further, the lock devices 5 are connected to the door handle 3 via a remote controller 6.

That is, in the sliding door 1 of the present embodiment, engagement states of the latch mechanisms 4 that configure each lock device 5 are released as a result of operation of operation units (an outer handle and an inner handle) 3a of the door handle 3. Further, it is possible to perform an opening-closing action by hand with the door handle 3 as a gripping unit.

In addition, the sliding door 1 of the present embodiment can even release the engagement states of the latch mechanisms 4 that configure the lock devices 5 as a result of a passenger operating an operation input unit 8 such as an operation switch which is provided inside a vehicle compartment or a portable device. Furthermore, an actuator 11 having a motor 10 as a driving source, and a door ECU 12 that controls action of the actuator 11 through the supply of driving power to the motor 10, are provided in the sliding door 1 of the present embodiment. That is, the door ECU 12 of the present embodiment generates driving power, which is supplied to the motor 10 of the actuator 11, on the basis of a power source voltage Vb of an on-vehicle power source (battery) 13. Further, as a result of this, a power sliding door apparatus 20, which is capable of performing an opening-closing action of the sliding door 1 on the basis of the driving force of the motor 10, is formed in the vehicle of the present embodiment.

To explain in more detail, an operation input signal S1, which indicates that the door handle 3 or the operation input unit 8, which is provided inside a vehicle compartment or in a portable device, was operated, is input to the door ECU 12 of the present embodiment. That is, the door ECU 12 of the present embodiment detects an opening-closing action request of the sliding door 1 from an end-user on the basis of the operation input signal S1. Further, the action of the actuator 11 is controlled in order to cause the sliding door 1 to move in a requested opening-closing operation direction.

To explain in still more detail, the actuator 11 of the present embodiment is provided with an opening-closing driving unit 21, which can perform opening-closing driving of the sliding door 1 through a driving cable (not illustrated in the drawing) by rotating on the basis of the driving force of the motor 10. In addition, a pulse sensor 22 that outputs a pulse signal Sp, which is synchronized with the action of the opening-closing driving unit 21, is provided in the actuator 11. Further, the door ECU 12 of the present embodiment has a configuration that controls the action of the actuator 11 on the basis of a movement position X and a movement velocity V of the sliding door 1, which are detected by counting the pulse signal Sp.

Additionally, an electromagnetic clutch 23, which is capable of connecting and disconnecting a torque transmission pathway between the motor 10 and the opening-closing driving unit 21, is provided in the actuator 11 of the present embodiment. For example, in a case in which the sliding door 1 is opened or closed by hand, the electromagnetic clutch 23 is controlled so as to disconnect the torque transmission pathway. Further, as a result of this, the power sliding door apparatus 20 of the present embodiment is configured so that the sliding door 1 performs an opening-closing action smoothly when operated by hand.

Furthermore, the door ECU 12 of the present embodiment controls the actions of each of the above-mentioned lock devices 5 through the output of a lock control signal S2. More specifically, in a case in which an opening-closing action is performed on the sliding door 1, which is in the fully open position or the fully closed position, firstly, the door ECU 12 controls the actions of the lock devices 5 (release control) before initiating driving control of the sliding door 1 in order to perform a release action on the latch mechanisms 4, which are in engagement states. Further, in a case in which the latch mechanisms 4 of the lock devices 5 are in a half latch state during the execution of driving control that moves the sliding door 1 to the fully closed position, the door ECU 12 controls the actions of the lock devices 5 (close control) in order to cause the latch mechanisms 4 to transition to a full latch state.

In addition, a cranking signal Scr, which indicates that cranking of an engine 31 is being performed, is input to the door ECU 12 of the present embodiment from an engine ECU 30. Further, the door ECU 12 of the present embodiment is configured to stop driving control of the sliding door 1 in a case in which the cranking signal Scr is received.

Furthermore, the door ECU 12 of the present embodiment approves the restart of driving control with the sliding door 1 as the target thereof in a case in which it is detected that the cranking of the engine 31 is finished as a result of cessation of the cranking signal Scr. Further, the door ECU 12 is configured to drive the sliding door 1 in an opening-closing operation direction prior to stopping of the driving control by restarting the stopped driving control of the sliding door 1.

That is, in light of the temporary reduction in the power source voltage Vb that occurs as a result of cranking of the engine 31, the power sliding door apparatus 20 of the present embodiment suspends the opening-closing driving of the sliding door 1 in such a state in which it is easy for the supply of driving power to become unstable. Further, the door ECU 12 is configured to complete opening-closing driving of the sliding door 1, which is requested by an end-user, after the reduced power source voltage Vb recovers.

Additionally, in a case in which driving control of the sliding door 1 was not being performed when the cranking signal Scr was received, or in other words, in a case in which the sliding door 1 is in the fully open position or the fully closed position, the door ECU 12 of the present embodiment prohibits the execution of new driving control until the cranking signal Scr is ceased. Further, the door ECU 12 is configured to maintain the electromagnetic clutch 23 in a connected state during stopping of the above-mentioned driving control with the sliding door 1 as the target thereof.

In this instance, when the stopped driving control of the sliding door 1 is restarted as a result of reception of the above-mentioned cranking signal Scr, the door ECU 12 of the present embodiment determines whether or not the movement position X of the sliding door 1 is in a positional range (an engagement action position) in which it is possible for the latch mechanisms 4 that configure the lock devices 5 to perform an engagement action.

More specifically, the door ECU 12 of the present embodiment retains, in a storage region 40 thereof, a positional range $\alpha 1$ in the vicinity of the fully open position and a positional range $\alpha 2$ in the vicinity of the fully closed position, which are set in advance, as engagement action positions of the latch mechanisms 4. That is, the door ECU 12 determines that the movement position X of the sliding door 1 is in an engagement action position of the latch mechanisms 4 in a case in which the detected movement position X of the sliding door 1 is within either one of the positional ranges $\alpha 1$ and $\alpha 2$. Further, in such a case, the door ECU 12 is configured to perform a release action of the latch mechanisms 4 by controlling the actions of the lock devices 5 before restarting the stopped driving control of the sliding door 1.

Figure 2:
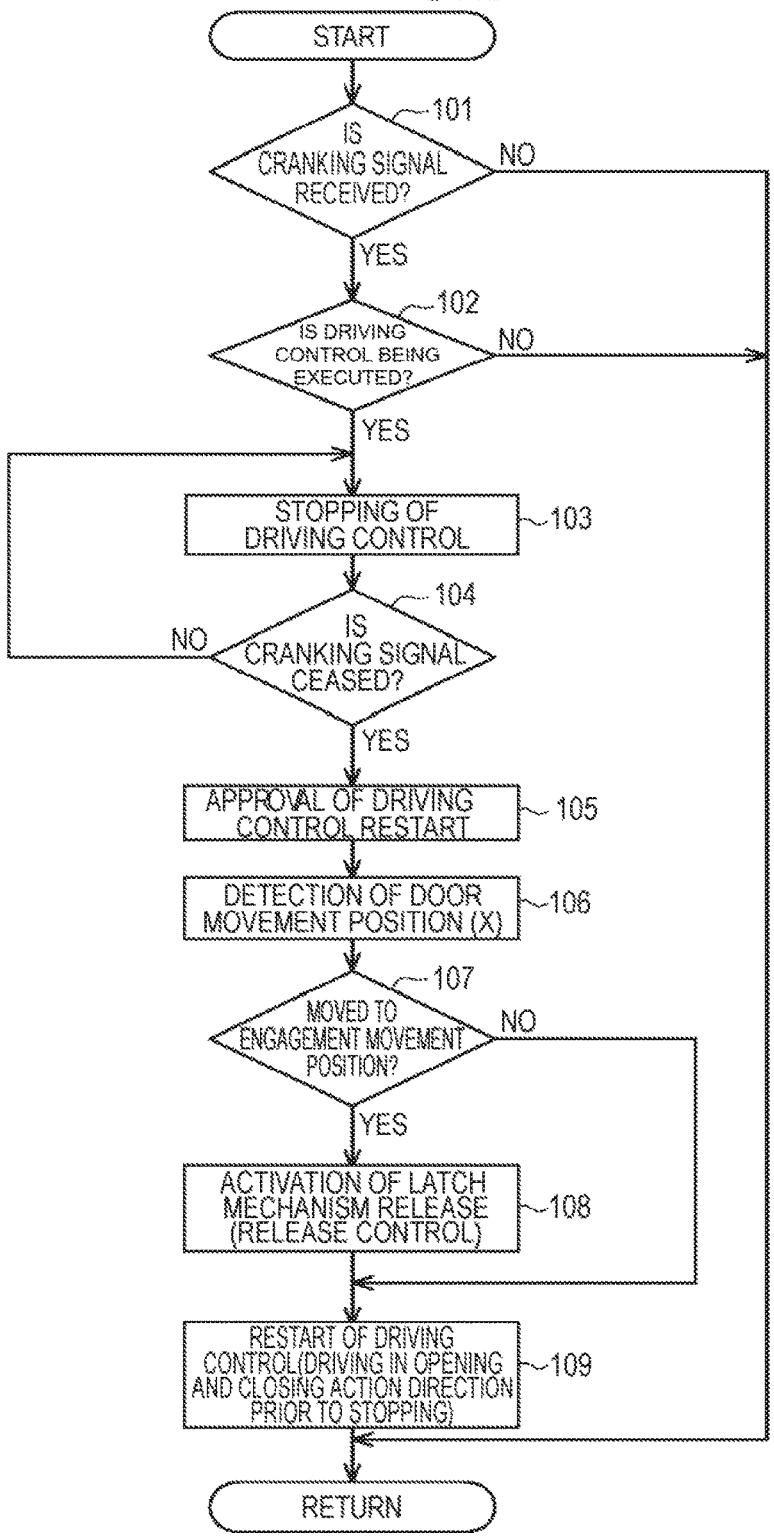
FIG. 2 is a flowchart that illustrates a process sequence of stopping and restart of driving control with a sliding door as a target.

To explain in more detail, as shown in the flowchart of FIG. 2, in a case of executing driving control of the sliding door 1 (Step 102: YES) in a case in which the cranking signal Scr is received (Step 101: YES), the door ECU 12 of the present embodiment stops the driving control of the sliding door 1 (Step 103). In addition, the door ECU 12 of the present embodiment continues the stopping of the driving control with the sliding door 1 as the target thereof while the cranking signal Scr is being received (Step 104: NO). Further, in a case in which the cranking signal Scr is ceased (Step 104: YES), restart of the driving control with the sliding door 1 as the target thereof, is approved (Step 105).

Next, the door ECU 12 of the present embodiment detects the movement position X of the sliding door 1 for which the restart of driving control with the sliding door 1 as the target thereof became possible (Step 106), and determines whether or not the movement position X of the sliding door 1 is in an engagement action position of the latch mechanisms 4 that configure the lock devices 5 (Step 107). Further, in a case in which the movement position X is in an engagement action position of the latch mechanisms 4 (Step 107: YES), a release action of the latch mechanisms 4 is performed (Step 108, release control) by controlling the actions of the lock devices 5.

Further, the door ECU 12 of the present embodiment is configured to subsequently drive the sliding door 1 in an opening-closing operation direction prior to stopping of the driving control by restarting the driving control of the sliding door 1 (Step 109).

Additionally, in a case in which it is determined that the movement position X of the sliding door 1 is not in an engagement action position of the latch mechanisms 4 that configure the lock devices 5 in Step 107 (Step 107: NO), the door ECU 12 of the present embodiment does not execute the above-mentioned release control of the latch mechanisms 4 in Step 108. Further, in a case in which it is determined that the cranking signal Scr is not being received in Step 101 (Step 101: NO), or in a case in which it is determined that driving control is not being executed in Step 102 (Step 102: NO), each of the above-mentioned processes of the Step 102 to Step 109 are not executed.

According to the embodiment that has been described above, it is possible to obtain the following effects.

(1) In a case in which driving control of the sliding door 1 is stopped and the restart of the driving control becomes possible thereafter (Step 105), the door ECU 12 determines whether or not the movement position X of the sliding door 1 for which the restart of the driving control became possible, is in an engagement action position of the latch mechanisms 4 that configure the lock devices 5 (Step 107). Further, in a case in which the movement position X of the sliding door 1 is in an engagement action position of the latch mechanisms 4 (Step 107: YES), the door ECU 12 performs a release action of the latch mechanisms 4 (Step 108, release control) by controlling the actions of the lock devices 5.

According to the above-mentioned configuration, even in a case in which there is a change in the movement position X of the sliding door 1 while driving control is stopped, interference of the latch mechanisms 4 is avoided, and it is possible to restart the driving control of the sliding door 1 more smoothly. Further, as a result of this, it is possible to ensure high sensitivity.

(2) The door ECU 12 stops driving control of the sliding door 1 as a result of cranking of the engine 31 being initiated, and approves restart of the driving control with the sliding door 1 as the target thereof as a result of the cranking finishing.

That is, during cranking of the engine 31, there are cases in which the power source voltage of the on-vehicle power source 13 is reduced temporarily due to a starter (not illustrated in the drawings) thereof consuming a large amount of power. Therefore, according to the above-mentioned configuration, it is possible to avoid a circumstance in which opening-closing driving of the sliding door 1 is performed in a reduced state of the power source voltage Vb in which it is easy for the supply of driving power to become unstable. Further, as a result of this, it is possible to ensure high sensitivity. In addition, in particular, in compact vehicles, and the like, in which the capacitance of the on-vehicle power source 13 is small, rapid engine starting is possible as a result of concentrating the output of the on-vehicle power source 13 to the starter. Further, as a result of this, it is possible to prevent over discharge of the on-vehicle power source by suppressing a power consumption amount.

(3) The door ECU 12 drives the sliding door 1 in an opening-closing operation direction prior to stopping of the driving control during restarting of driving control with the sliding door 1 as the target thereof. As a result of this, it is possible to improve convenience as a result of an end-user successfully executing requested opening-closing driving of the sliding door 1.

Additionally, the above-mentioned embodiment may be changed in the following manner.

In the above-mentioned embodiment, this disclosure is objectivized as the power sliding door apparatus 20, which performs an opening-closing action of the sliding door 1 provided on a side surface of a vehicle. However, this disclosure is not limited to this, and may also be applied to a swing type door, a back door, a luggage door or the like that is provided in a rear portion of a vehicles, or another power door apparatus. Further, this disclosure may also be applied to a vehicle opening-closing body control apparatus with an opening-closing body other than a door as the target thereof, such as a sunroof apparatus or a power window apparatus.

In the above-mentioned embodiment, the movement position X and the movement velocity V of the sliding door 1 are detected on the basis of the pulse signal Sp, which is synchronized with the action of the opening-closing driving unit 21 of the actuator 11, but the detection method thereof may be changed arbitrarily. Further, the configuration of the actuator 11 may also be changed arbitrarily.

In the above-mentioned embodiment, the door ECU 12 retains, in the storage region 40 thereof, the positional range α1 in the vicinity of the fully open position and the positional range α2 in the vicinity of the fully closed position, which are set in advance, as engagement action positions of the latch mechanisms 4. Further, it is determined that the movement position X of the sliding door 1 is in an engagement action position of the latch mechanisms 4 in a case in which the detected movement position X of the sliding door 1 is within either one of the positional ranges α1 and α2. However, this disclosure is not limited to this, and for example, in a case in which the lock devices 5 output signals (for example, half latch signals) that indicate an engagement action of the latch mechanisms 4, may have a configuration that determines whether or not the movement position X of the sliding door 1 is in an engagement action position of the latch mechanisms 4 on the basis of output signals of the lock devices 5.

In the above-mentioned embodiment, driving control of the sliding door 1 is stopped when cranking, which is a state in which it is easy for the power source voltage Vb to be reduced, is initiated, and restart of the stopped driving control is approved after cranking is finished, when it is thought that the power source voltage Vb is recovered. However, this disclosure is not limited to this, and may have a configuration that stops driving control of the sliding door 1 and approves restart of the stopped driving control by directly monitoring (detecting) the power source voltage Vb of the on-vehicle power source 13.

Figure 3:
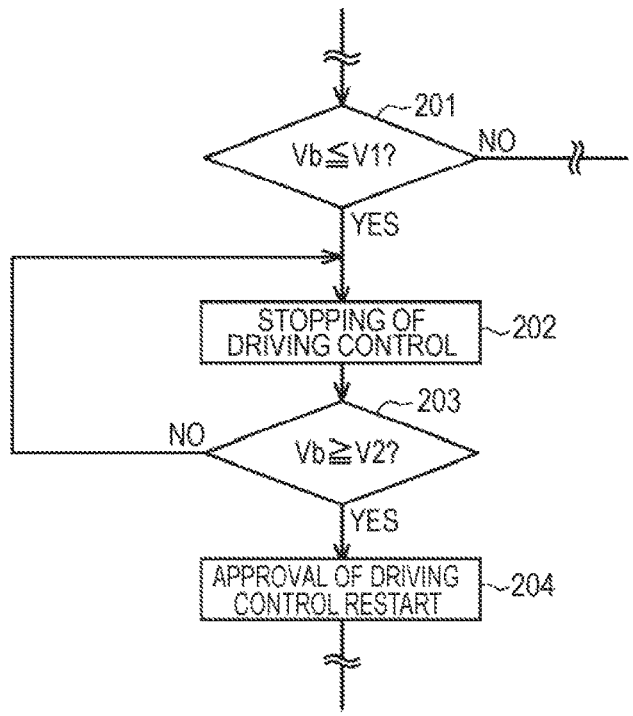
FIG. 3 is a flowchart that illustrates a process sequence of another example that relates to stopping and restart of driving control with a sliding door as a target.

For example, as shown in the flowchart of FIG. 3, it is determined whether or not the power source voltage Vb of the on-vehicle power source 13 is a first threshold value V1 or less (Step 201), and driving control of the sliding door 1 is stopped (Step 202) in a case in which the power source voltage Vb is the first threshold value V1 or less (Step 201: YES, Vb≤V1). In addition, in a case in which the driving control of the sliding door 1 is stopped, it is determined whether or not the power source voltage Vb is a second threshold value V2 or more (Step 203). Further, a configuration that approves restart of driving control with the sliding door 1 as the target thereof (Step 204) in a case in which the power source voltage Vb is the second threshold value V2 or more (Step 203: YES, Vb≥V2), may be used.

That is, even in this case, stopping of driving control with the sliding door 1 as the target thereof is continued as long as the power source voltage Vb of the on-vehicle power source 13 falls below the second threshold value V2 (Step 203: NO, Vb<V2). Further, it is possible to perform stopping determination and approval determination stably by setting the second threshold value V2 in the above-mentioned approval determination of Step 203 to be a higher value than the first threshold value V1 in the above-mentioned stopping determination of Step 201 (V2>V1).

Furthermore, in addition to this, a configuration that stops driving control of the sliding door 1 and approves restart of the stopped driving control on the basis of events other than cranking for which there is a possibility that the power source voltage Vb of the on-vehicle power source 13 will be reduced, may also be used.

Furthermore, this disclosure may include a configuration that, in a case in which driving control of the sliding door 1 is stopped in a movement position between the fully open position and the fully closed position, and the restart of the driving control becomes possible thereafter, performs a release action of the latch mechanisms 4 in a case in which the movement position X of the sliding door 1 in a state in which the restart of the driving control became possible, is in an engagement action position of the latch mechanisms 4. That is, a condition for stopping driving control with the sliding door 1 as the target thereof, and a condition for approving the restart of the stopped driving control need not necessarily be based on a reduction in the power source voltage Vb and the recovery thereof.

In the above-mentioned embodiment, the door ECU 12 drives the sliding door 1 in the opening-closing operation direction before stopping thereof in a case in which the restart of driving control becomes possible after driving control with the sliding door 1 as the target thereof is stopped. However, this disclosure is not limited to this, and for example, an opening-closing operation direction when restarting the stopped driving control may be changed arbitrarily such as reverting the sliding door 1 to the fully open position or the fully closed position from which driving control was initiated before stopping. Further, the action of the sliding door 1 at a point in time at which the driving control is stopped may be a state of temporarily not moving due to the stopped driving control.

Figure 4:
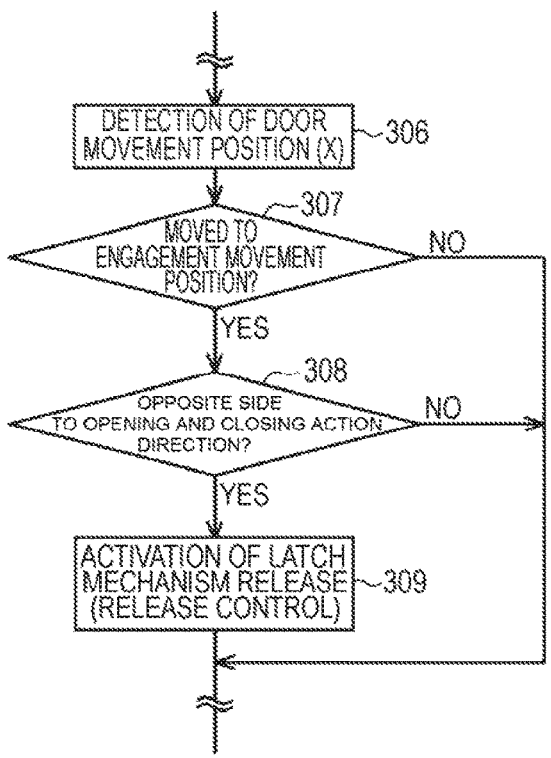
FIG. 4 is a flowchart that illustrates a process sequence of another example that relates to stopping and restart of driving control with a sliding door as a target.

In addition, as shown in the flowchart of FIG. 4, in a case in which it is determined that the movement position X of the sliding door 1 is in an engagement action position of the latch mechanisms 4 in a state in which the restart of driving control becomes possible (Step 307: YES), it is determined whether or not the engagement action position is on the opposite side to the opening-closing operation direction of the sliding door 1 according to the restart of driving control (Step 308). Further, a configuration that performs a release action of the latch mechanisms 4 (Step 309, release control) by controlling the actions of the lock devices 5 in a case in which the engagement action position is on the opposite side to the opening-closing operation direction of the sliding door 1 according to the restart of driving control (Step 308: YES), may be used.

That is, in a case in which the sliding door 1 is in the engagement action position on the opposite side to the opening-closing action direction due to the restart of driving control, it is easy for interference of the latch mechanisms 4 to occur when the driving control is restarted. In addition, in a case in which the sliding door 1 is in the engagement action position on an opening-closing action direction side due to the restart of the driving control, there are also cases in which it is possible to transition to a finishing process of the driving control without change. Accordingly, by adopting such a configuration, it is possible to efficiently and effectively prevent the interference of the latch mechanisms 4. As a result of this, it is possible to restart driving control of the sliding door 1 more smoothly.

Furthermore, with respect to a device that executes insertion reverse control so as to reverse the driving direction of the sliding door 1 in a case in which the driving load of the sliding door 1 is increased before reaching a reference movement position, "a configuration that performs a release action of the latch mechanisms 4 when stopped driving control is restarted" such as that exemplified in the above-mentioned embodiment and other examples, may also be applied. That is, in an apparatus that includes driving direction reverse control logic, it is possible to repeat the reversal of the driving direction in a case in which movement of the sliding door 1 is regulated at a stage before the sliding door 1 reaches a reference movement position. Accordingly, by adopting such a configuration, it is possible to obtain a more prominent effect.

As long as the sliding door 1 can be retained in the fully open position and the fully closed position on the basis of the engagement action of the latch mechanisms 4, and the door ECU 12 can perform a release action of the latch mechanisms 4, the lock devices 5 may have any configuration.

In the above-mentioned embodiment and other examples, the door ECU 12 controls the actions of the actuator 11 as the driving device and each lock device 5. Further, the door ECU 12 was configured to function as a control device including a position determination unit, an engagement release control unit, a stopping control unit, an approval determination unit, a driving restart control unit and a reverse driving control unit. However, this disclosure is not limited to this, and may have a configuration that is formed in a shape in which such control devices are distributed in a plurality of information processing apparatuses. Further, each of the above-mentioned functional control sections may also be distributed to each information processing apparatus.

Next, the technical idea that can be understood from the above-mentioned embodiment will be described along with the effects thereof.

(I) A vehicle opening-closing body control apparatus in which the control device is provided with a reverse driving control unit that reverses a driving direction of an opening-closing body in a case in which a driving load of the opening-closing body is increased before reaching a reference movement position.

That is, in an apparatus that includes driving direction reverse control logic, it is possible to repeat the reversal of the driving direction in a case in which movement of an opening-closing body is regulated at a stage before the opening-closing body reaches a reference movement position. Accordingly, by adopting a "configuration that performs a release action of a latch mechanism when restarting stopped driving control" in such an apparatus, it is possible to obtain a more prominent effect.

A vehicle opening-closing body control apparatus according to an aspect of this disclosure preferably includes a driving device that drives an opening-closing body of a vehicle, a lock device that retains the opening-closing body in a fully open position and a fully closed position by including a latch mechanism, which performs an engagement action depending on a movement position of the opening-closing body, and a control device that controls the actions of the driving device and the lock device, and the control device is preferably includes a position determination unit that determines whether or not the movement position of the opening-closing body is in an engagement action position of the latch mechanism in a case in which driving control of the opening-closing body is stopped, and it becomes possible for the driving control to be restarted thereafter, and an engagement release control unit that causes the latch mechanism to perform a release action by controlling the action of the lock device in a case in which it is determined that the movement position of the opening-closing body is in the engagement action position of the latch mechanism.

According to the above-mentioned configuration, even in a case in which there is a change in the movement position of the opening-closing body while driving control is stopped, interference of the latch mechanism is avoided, and it is possible to restart the driving control of the opening-closing body more smoothly. Further, as a result of this, it is possible to ensure high sensitivity.

In the vehicle opening-closing body control apparatus, it is preferable that the engagement release control unit causes the latch mechanism to perform a release action in a case in which the movement position of the opening-closing body is in the engagement action position on an opposite side to an opening-closing action direction of the opening-closing body due to restart of the driving control.

That is, in a case in which the opening-closing body is in the engagement action position on the opposite side to the opening-closing action direction due to the restart of driving control, it is easy for interference of the latch mechanism to occur when the driving control is restarted. Further, in a case in which the opening-closing body is in the engagement action position on an opening-closing action direction side due to the restart of the driving control, there are also cases in which it is possible to transition to a finishing process of the driving control without change. Accordingly, by adopting such a configuration, it is possible to efficiently and effectively avoid the interference of the latch mechanism. As a result of this, it is possible to restart driving control of the opening-closing body more smoothly.

In the vehicle opening-closing body control apparatus, it is preferable that the driving device receives supply of driving power based on a power source voltage of an on-vehicle power source, and the control device further includes a stopping control unit that stops driving control of the opening-closing body when there is a reduction in the power source voltage, and an approval determination unit that approves restart of the driving control in a case in which the power source voltage is recovered.

According to the above-mentioned configuration, it is possible to avoid a circumstance in which opening-closing driving of the opening-closing body is performed in a reduced state of the power source voltage in which it is easy for the supply of driving power to become unstable. Further, as a result of this, it is possible to ensure high sensitivity.

In the vehicle opening-closing body control apparatus, it is preferable that the stopping control unit stops driving control of the opening-closing body as a result of cranking of an engine being initiated, and the approval determination unit approves restart of the driving control as a result of the cranking finishing.

That is, during cranking of an engine, there are cases in which the power source voltage of an on-vehicle power source is reduced temporarily due to a starter thereof consuming a large amount of power. Therefore, according to the above-mentioned configuration, it is possible to avoid a circumstance in which opening-closing driving of the opening-closing body is performed in a reduced state of the power source voltage in which it is easy for the supply of driving power to become unstable. In addition, in particular, in compact vehicles, and the like, in which the capacitance of the on-vehicle power source is small, rapid engine starting is possible as a result of concentrating the output of the on-vehicle power source to the starter. Further, as a result of this, it is possible to prevent over discharge of the on-vehicle power source by suppressing a power consumption amount.

In the vehicle opening-closing body control apparatus, it is preferable that the control device further includes a driving restart control unit that drives the opening-closing body in an opening-closing action direction before stopping of the driving control when the driving control is restarted.

According to the above-mentioned configuration, it is possible to improve convenience as a result of an end-user successfully executing requested opening-closing driving of the opening-closing body.

In the vehicle opening-closing body control apparatus, it is preferable that the control device further includes a reverse driving control unit that reverses a driving direction of the opening-closing body in a case in which a driving load of the opening-closing body is increased before reaching a reference position.

According to the aspect of this disclosure, it is possible to restart the stopped driving control of an opening-closing body more smoothly.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle opening-closing body control apparatus comprising:
   an actuator that drives an opening-closing body of a vehicle;
   a lock that retains the opening-closing body in a fully open position and a fully closed position by including a latch mechanism, which performs an engagement action depending on a movement position of the opening-closing body; and
   circuitry that controls the actions of the actuator and the lock,
   wherein the circuitry is configured to:
      determine whether or not the movement position of the opening-closing body is in an engagement action position of the latch mechanism in case driving control of the opening-closing body is stopped, and it becomes possible for the driving control to be restarted thereafter, the engagement action position corresponding any one of a given positional range of the fully open position and a given positional range of the fully closed position, and
      cause the latch mechanism to perform a release action by controlling the action of the lock in case it is determined that the movement position of the opening-closing body is in the engagement action position of the latch mechanism.

2. The vehicle opening-closing body control apparatus according to claim 1,
   wherein the circuitry is configured to further cause the latch mechanism to perform a release action in case the movement position of the opening-closing body is in the engagement action position on an opposite side to an opening-closing action direction of the opening-closing body due to restart of the driving control.

3. The vehicle opening-closing body control apparatus according to claim 1,
   wherein the actuator receives supply of driving power based on a power source voltage of an on-vehicle power source, and
   the circuitry is further configured to:
      stop driving control of the opening-closing body when there is a reduction in the power source voltage, and
      approve restart of the driving control in case the power source voltage is recovered.

4. The vehicle opening-closing body control apparatus according to claim 3,
   wherein the circuitry is further configured to stop driving control of the opening-closing body as a result of cranking of an engine being initiated, and
   to approve restart of the driving control as a result of the cranking finishing.

5. The vehicle opening-closing body control apparatus according to claim 1,
   wherein the circuitry is further configured to drive the opening-closing body in an opening-closing action direction before stopping of the driving control when the driving control is restarted.

6. The vehicle opening-closing body control apparatus according to claim 1,
   wherein the circuitry is further configured to reverse a driving direction of the opening-closing body in case a driving load of the opening-closing body is increased before reaching a reference position.

* * * * *